United States Patent Office 3,507,956
Patented Apr. 21, 1970

3,507,956
TREATMENT OF YOUNG ANIMALS WITH DIALKYL BETA-CHLOROVINYL PHOSPHATE
Edward G. Batte, Raleigh, N.C., Tage J. Fogg, Allendale, N.J., and Maurice A. Schooley, White Plains, N.Y., assignors to Shell Oil Company, New York, N.Y., a corporation of Delaware
No Drawing. Filed Dec. 27, 1967, Ser. No. 693,752
Int. Cl. A61k 27/00
U.S. Cl. 424—78    4 Claims

ABSTRACT OF THE DISCLOSURE

The vitality of foeti and new-born young of mammals is increased by administering to the prospective mother prior to parturition an effective dosage of at least one dialkyl beta-chlorovinyl phosphate.

BACKGROUND OF THE INVENTION

Field of the invention

This invention relates to treatment of pregnant female mammals to increase the vitality of their young. By the treatment provided by the invention, (a) the foeti are more vital, resulting in fewer stillbirths, and fewer deaths due to the physical rigors of birth; (b) the young are improved in over-all health, resulting in an increase in the number that live through weaning and to maturity; and (c) the young are improved in growth characteristics, resulting in fewer runts and generally higher weight gains, in comparison to similar aged test subjects originating from nontreated pregnant females in accordance with this invention.

Description of the prior art

No art is known relative to treating a prospective mother animal with a chemical, not ordinarily included in the mother's food and water, for the purpose of increasing the vitality of her new-born young. In particular, it has not been known to employ for such a purpose an organophosphate, intrinsically highly toxic to animals.

U.S. Patent 3,166,472 is drawn to treatment of warm-blooded animals with a dialkyl beta-halovinyl phosphate—i.e., dimethyl 2,2-dichlorovinyl phosphate, commonly known by the abbreviation: DDVP—for an entirely different purpose: to control internal worm parasites of the animals. According to the patent, the phosphate is formulated as an intimate admixture with a polyvinyl chloride resin, and the formulation is orally administered to provide a dosage of DDVP which produces the desired results.

SUMMARY OF THE INVENTION

It has unexpectedly been found that when an effective amount of a dialkyl beta-chlorovinyl phosphate, such as dimethyl 2,2-dichlorovinyl phosphate, is administered to a prospective mother mammal, in addition to killing internal worm parasites present in the mother, the phosphate has the following effects: fewer of the foeti are stillborn, more young survive the birth, the young are more resistant to disease, more young survive weaning, and the survivors have better general health and growth characteristics, in comparison to similar aged test subjects of the same species who were treated the same but originated from pregnant females not receiving the phosphate.

While there is no clear explanation of these unexpected results, they appear to flow from the fact that the foeti and young animals seem to have greater vitality, compared to young animals of the same species born of mothers which were not treated with the phosphate. It appears that in part, at least, this increase in vitality arises from an increased concentration of glucose in the blood of the fetus and newly-born animal, the phosphate in some way acting to increase the glucose content of the blood of the fetus and new-born animal, as compared to the glucose content of the blood of the fetus and new-born animal of the same species born of a mother who was not treated with the phosphate. The glycogen content of the liver and skeletal muscles of new-born young of mothers treated according to this invention also is higher than that of new-born young of the same species whose mothers were not so treated. These facts do not appear to provide a complete explanation, however, since the effects of the treatment of the mother upon her offspring appear to be much more profound than would be expected from a mere increase in the glucose content in the blood of the fetus and initially in the blood of the new-born animal, and the glycogen content of the liver and skeletal muscles of the fetus and new-born animal.

Whatever the reason(s), the effects on the young of treatment of the prospective mother according to the invention is quite evident, as will be demonstrated by the results of tests described in the working examples set forth hereinafter.

The effects of the treatment are not due to removal of internal parasites of the mother, but are independent of, and in addition to, any improvement in the mother herself resulting from removal of the parasites. Treatment of the prospective mother according to this invention appears to desirably alter the metabolic process of her young.

The effects upon the young animals are important, from the standpoint of the commercial animal grower, since they result in greater yield of salable animal for a given expenditure of care, feed, and overall investment in a given pregnant female mammal.

A further advantage of the treatment of the prospective mother according to this invention is that the time the mother is in labor is substantially reduced. This reduces the physical rigors of birth, with respect to both the mother and the young.

Generically, the invention can be defined as: a method for increasing the vitality of a fetus of a mammal, and the new-born animal, which comprises administering to the prospective mother prior to parturition an effective dosage of at least one dialkyl beta-chlorovinyl phosphate.

DESCRIPTION OF THE PREFERRED EMBODIMENTS

The effective phosphates, according to this invention, may be described by the general formula:

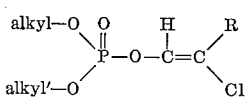

in which alkyl and alkyl' may be the same or different alkyl groups containing from 1 to 4 carbon atoms each, with the proviso that when alkyl is methyl, alkyl' can contain up to 20 carbon atoms, and R represents hydrogen or chlorine, preferably chlorine.

The alkyl groups represented by alkyl and alkyl' may be the same, or they may be different, with respect to number of carbon atoms, and/or as to configuration—i.e., they may each be straight-chain, or branched-chain, or one may be straight-chain and the other branched-chain in configuration.

Typical, illustrative species of this class of compounds include:

dimethyl 2-chlorovinyl phosphate (cis); same (trans);
dimethyl 2,2-dichlorovinyl phosphate;
diethyl 2-chlorovinyl phosphate;
diethyl 2,2-dichlorovinyl phosphate;
methyl ethyl 2,2-dichlorovinyl phosphate;
methyl propyl 2,2-dichlorovinyl phosphate;
methyl isopropyl 2,2-dichlorovinyl phosphate;
methyl butyl 2,2-dichlorovinyl phosphate;
ethyl propyl 2,2-dichlorovinyl phosphate;
ethyl isopropyl 2,2-dichlorovinyl phosphate;
methyl isobutyl 2,2-dichlorovinyl phosphate;
methyl sec-butyl 2,2-dichlorovinyl phosphate;
methyl tert-butyl 2,2-dichlorovinyl phosphate;
methyl isoamyl 2,2-dichlorovinyl phosphate;
methyl pentyl 2,2-dichlorovinyl phosphate;
methyl hexyl 2,2-dichlorovinyl phosphate;
methyl heptyl 2,2-dichlorovinyl phosphate;
methyl octyl 2,2-dichlorovinyl phosphate;
methyl sec-octyl 2,2-dichlorovinyl phosphate;
methyl nonyl 2,2-dichlorovinyl phosphate;
methyl dodecyl 2,2-dichlorovinyl phosphate;
methyl hexadecyl 2,2-dichlorovinyl phosphate.

Compounds of this class are known: U.S. Patent 2,956,073; U.S. Patent 3,299,190. These patents also teach preparation of such compounds.

The phosphate can be administered to the prospective mother by conventional pharmacological techniques, employing suitable conventional pharmaceutical preparations.

The phosphate can be administered orally or parenterally. Generally, oral administration will be found to be most convenient, particularly where the phosphate is formulated in one of the preferred manners, as described hereinafter. The phosphate can be administered in the form of a single dose or it can be administered as a series of dosages at more or less regular intervals, or administered continuously, for a specific period of time. It may conveniently be incorporated in the food and/or drinking water of the animal being treated, or in a food supplement, such as a protein supplement, mineral or trace mineral supplement, vitamin supplement, or the like. The preferred formulations described hereinafter lend themselves readily to administration via the animal's food. Otherwise, the phosphate may be used neat or formulated and introduced orally via intubation or by other oral injection technique, or given as a drench.

Suitable preparations of the phosphates can consist of one or more of them in admixture or in conjunction with a solid or liquid, organic or inorganic, physiologically acceptable excipient, the preparation in each case being physically suitable for the intended mode of administration.

Preparations suitable for oral use can be liquids or solids or any combinations of these forms, such as syrups, elixirs, emulsions, powders, capsules or tablets. Preparations for administration of the phosphates in unit dose can take the form of compressed powders or tablets or of a powder enclosed in a suitable capsule material such as gelatin. Suitable excipients include such materials as starch, lactose, stearic acid, magnesium stearate, dextrine, polyvinyl pyrrolidone, talc, gums, vegetable oils, benzyl alcohols, polyalkylene glycols, or other conventional medical excipients.

However, it is preferred that the phosphate be formulated in a polyvinyl chloride resin. The phosphates of this invention being soluble (or miscible) with such resins, the preparation of such formulations is readily effected by warming and mixing the resin and phosphate together. These formulations appear to have the advantage of prolonging and smoothing out the action of the phosphate by controlling the rate at which it is made available to the animal. Also, they improve the safety factor of the phosphate. Formulations of this kind are described in U.S. Patent 3,318,769.

Preparations for parenteral administration may be in the form of a sterile solution or suspension of the phosphate in such liquids as water, physiological saline, benzyl alcohol, ethyl oleate, corn oil, peanut oil, Carbowax 600 (water soluble polyethylene, molecular weight approximately 600), Carbowax 400 (water soluble polyethylene, molecular weight approximately 400), glycerol monooleate, Methocel (water soluble methylcellulose), dimethyl sulfoxide and the like.

The phosphate can be administered via the prospective mother's food, or in a food supplement. Preferably, it is suitably formulated to avoid decomposition of the phosphate by chemicals present in the food. It may be combined with a carrier which is nonreactive with respect to the phosphate and may be administered with safety to the animals to be treated. The carrier may be one of the ingredients of the animal feed or it may be an extraneous material, such as attapulgus clay, pyrophyllite, bentonite or the like, or a vegetable material such as corn cob meal, walnut shell flour, citrus meal, grain meal, grain hull meal, or a material of animal origin, such as bone meal, oyster shell meal, blood meal, fish meal or the like. Preferably, the phosphate is formulated in a polyvinyl chloride resin as heretofore herein described. If it is desired to premix the formulation with the animal feed, then the formulation can be suitably coated to protect the active material from the effect of materials in the feed. Useful coated polyvinyl chloride resin formulations of the phosphates are the subject of copending application Ser. No. 408,415 which issued Aug. 20, 1968, as U.S. Patent 3,398,225.

When administered via the food of an animal to be treated, the phosphate concentration in the food suitably can be as little as 10 parts per million, or as high as 2000 parts per million, of the weight of the treated food. When administered via the drinking water of the animal, suitable concentrations of the phosphate lie within the range of from about 10 to about 1000 parts per million, by weight of the treated water. It has been found that because of taste and/or odor of the phosphates, swine will not freely drink water containing over about 500 parts per million of the phosphate. Possibly the concentration of phosphate in drinking water acceptable to other species of animals also will be limited for the same reasons.

The dosage of phosphate used will depend upon the particular phosphate(s) employed, the species of animal to be treated, the character of the formulation to be used, and whether the phosphate is to be administered in a single dose, or in a series of dosages. These factors and the manner in which they must be taken into account will be clear from consideration of this patent specification. The minimum effective dosage apparently is of the order of about 0.0015 equivalent of the phosphate, based on the phosphorus content. In the case of DDVP, this dosage amounts to about 1.5 milligrams DDVP per kilogram of animal body weight. It is generally desirable to provide at least twice the minimum dosage and in most cases somewhat more, say, up to twenty times the minimum dosage, to insure that an effective dosage has been administered. From the available evidence no undesirable side-effects have been noticed at dosages below those which are toxic to the animal—as for example, dosages resulting in definite reduction in the cholinesterase level of the animal's blood. Since these phosphates rapidly metabolize in the animal, to form innocuous products which do not build up in the animal, the minimum effective dosage may be attained by multiple smaller dosages administered periodically. In most cases, however, the minimum dosage can be administered in a single treatment without ill effect to the prospective mother animal or the foeti.

When formulated in a polyvinyl chloride resin, only part of the phosphate passes from the resin to the animal during passage of the formulation through the animal. Ordinarily, from about 20% to about 50% of the phosphate is made available to the animal in such cases.

The phosphate can be administered at any time during pregnancy of the prospective mother, and/or it can be administered in part prior to pregnancy. The phosphate must be administered a substantial period of time before birth of the young. Thus, if administered in a single dose, that dose should be given at least one week before birth of the young, or if given in a series of dosages, the series should be started in time to provide the minimum effective dosage at least one week before birth of the young. Administration of the phosphate can continue up to the time the young are born. The criterion in any case is to provide a sufficient dosage to the prospective mother at a time and for a time sufficient to attain the desired effect upon the fetus(es) and new-born animal(s).

From the available evidence, the effect of the phosphates appears to be general with respect to mammals generally, without regard to whether the prospective mother is monogastric or ruminant in character, whether the prospective mother is of a uniparous species, or is of a multiparous species, or whether the prospective mother has or has not borne offspring before. The method of the invention accordingly is applicable to laboratory animals, such as mice, guinea pigs, hamsters, rabbits, monkeys, and the like; to pets such as dogs and cats; to fur-bearing animals, such as foxes, mink and the like; to domestic animals such as pigs, cattle, sheep, goats, horses and the like; and to other animals, such as wild animals in zoos and protected areas.

The effectiveness of these phosphates in increasing vitality of foeti and newly born mammals, and the manner in which they can be used for such a purpose, is set forth in the following examples:

EXAMPLE 1

A total of 1138 gilts and sows were treated with a single dosage of DDVP. The gilts weighed about 300-350 pounds each; the sows weighed about 400-500 pounds each. The DDVP was formulated as an intimate admixture with a polyvinyl chloride resin, the formulation containing twenty percent by weight of DDVP. The formulation was in the form of small cylindrical pellets, 0.05 inch diameter, 0.125 inch in length. The formulation was mixed with a complete pig ration to provide 500 parts per million by weight of the formulation in the mixture. 6 pounds of feed were administered to each animal. This provided a total of 1.36 grams DDVP per animal, of which about 0.6 gram were absorbed per animal. This amounts to a dosage of from about 4.5 milligrams available DDVP per kilogram of animal body weight, in the case of 300 pound gilts, to about 2.8 milligrams per kilogram of animal body weight for 500 pound sows. All of the tests were conducted under practical field conditions of management. Control treatments were utilized in all trials.

The DDVP was administered to pregnant female swine 7 to 14 days before parturition, or during the last trimester of gestation.

The following results were obtained:

TABLE I

| Treatment | Number sows and gilts [1] | Total foeti | Average/litter Born alive and surviving first 24 hours | Stillborn and 24-hour Mortality |
|---|---|---|---|---|
| None (control groups) | 574 | 10.96 | 10.24 | 0.72 |
| DDVP | 564 | 11.19 | [2] 10.73 | [3] 0.46 |
| Total | 1,138 | | | |

[1] Twenty-seven (27) test sites.
[2] The number of pigs born alive and surviving 24 hours in treated group was significantly greater (P<0.05) than control group.
[3] The number of pigs stillborn and expiring within 24 hours of birth was significantly less (P<0.01) than the control group.

These results demonstrate DDVP treatment caused:

(a) A significant decrease in the number of piglets stillborn and/or dying within 24 hour of birth;

(b) A significant increase in the number of piglets born alive and surviving the first 24 hours after birth, relative to the control counterparts.

EXAMPLE 2

The results obtained in the tests described in Example 1 were confirmed in two further trials. The test procedure was the same. The results are described in Tables 2 and 3:

TABLE 2

| Treatment | Number sows | Average birth weight, pounds | Total foeti | Live-born | Still-born | Percent Stillborn |
|---|---|---|---|---|---|---|
| None | 4 | 3.3 | 10.8 | 8.8 | 2.0 | 18.6 |
| DDVP | 4 | 3.3 | 8.2 | 7.5 | 0.7 | 9.1 |

TABLE 3

| Treatment | Number sows and gilts | Total foeti | Born alive | Born dead | Percent change |
|---|---|---|---|---|---|
| None | 22 | 11.7 | 226(10.3) | 30(1.4) | |
| DDVP | 20 | 11.4 | 220(11.0) | 8(0.4) | 73 |

Figures in ( ) = Average number/litter.

EXAMPLE 3

In further tests conducted as described in Example 1 but conducted for a longer time, it was found that in addition to reducing early mortality, DDVP also reduced mortality after the first 24-hour period following birth, increasing the number of piglets surviving the weaning, compared to the control count. The piglets' only food was their mothers' milk. The results are summarized in Table 4.

TABLE 4

| Treatment | Number Sows | Birth weight, pounds | Foeti | Live-born | Still-born | 24-hour livability | Pigs weaned | Total weight, mortality | Weaning weight, pounds | Percent difference |
|---|---|---|---|---|---|---|---|---|---|---|
| None | 22 | 3.3 | 10.6 | 10.4 | 0.2 | 9.3 | 6.4 | 39.6 | 800 | |
| DDVP | 23 | 3.3 | 9.4 | 9.4 | 0.0 | 8.6 | 7.0 | 25.6 | 808 | 10.0 |

It also is to be noted that the surviving piglets grew better than their control counterparts.

EXAMPLE 4

The improved growth characteristics of piglets born of treated mothers, compared to their control counterparts, was demonstrated in further tests. In these tests the mothers were treated as described in Example 1, the piglets were fed by their mothers, then were weaned and thereafter were fed the same and were otherwise identically treated. The results are reported in Table 5.

TABLE 5

| Treatment | Number sows | Number pigs started | 2 weeks Average weight, pounds | 2 to 10 weeks Number pigs removed for therapeutic treatment[1] | 10 weeks Number pigs | 10 weeks Average weight, pounds | 10 to 16 weeks Number pigs removed for therapeutic treatment[1] | 16 weeks Number pigs | 16 weeks Average weight, pounds | Percent difference in body weight |
|---|---|---|---|---|---|---|---|---|---|---|
| None | 11 | 66 | 9.7 | 12 | 54 | 30.6 | 10 | 44 | 82.8 | |
| DDVP | 11 | 66 | 9.9 | 3 | 63 | 34.2 | 3 | 60 | 94.7 | 14 |

[1] Piglets removed for treatment of diarrhea, pneumonia, or other non-specific disease. The treated piglets were not returned to the test after treatment.
NOTE.—All pigs individually identified by treatment. All pigs fed one ration in one pen.

The improved growth characteristics of the piglets from treated mothers is clearly evident.

Also evident is the fact that the piglets of treated mothers were much more resistant to disease than their control counterparts.

EXAMPLE 5

In another series of tests, pregnant female swine were continuously fed a polyvinyl chloride formulation of DDVP for 21 to 61 days prior to farrowing. The formulation was included in the feed, which was a complete ration. The formulation contained 20% DDVP by weight. Two dosage levels were used: average daily intake of 400 milligrams DDVP per sow or gilt per day (125 p.p.m. formulation in feed) and average daily intake of 800 milligrams DDVP per sow or gilt per day (250 p.p.m. formulation in feed). The actual dosage of DDVP absorbed per sow or gilt was of the order of from about 1.32 (400 milligram dosage) to about 2.64 milligrams DDVP per kilogram of body weight (300 pound gilt) to from about 0.80 (400 milligram dosage) to about 1.59 milligrams DDVP per kilogram of body weight (500 pound sow).

The results confirmed the results of single dose treatment and are summarized in Tables 6–11.

TABLE 6

| Treatment | Number sows and gilts | Average/litter Total foeti | Average/litter Born alive | Average/litter Still-born |
|---|---|---|---|---|
| None | 42 | 11.2 | 10.1 | 1.1 |
| 400 mg. DDVP/day/subject | 41 | 10.8 | 10.4 | 0.4 |
| 800 mg. DDVP/day/subject | 41 | 10.6 | 10.2 | 0.4 |

TABLE 7

| Treatment | Class | Number subjects | Average/litter Total foeti | Average/litter Live-born | Average/litter Still-born |
|---|---|---|---|---|---|
| None | Gilt | 15 | 10.6 | 9.7 | 0.9 |
| | Sow | 27 | 11.6 | 10.4 | 1.2 |
| 400 mg. DDVP/day/subject | Gilt | 19 | 10.6 | 10.3 | 0.3 |
| | Sow | 22 | 11.4 | 10.6 | 0.5 |
| 800 mg. DDVP/day/subject | Gilt | 21 | 10.8 | 10.5 | 0.3 |
| | Sow | 20 | 11.0 | 10.4 | 0.6 |

TABLE 8

| Treatment | Number sows and gilts 21–28 days | Number sows and gilts 61 days | Total foeti 21–28 days | Total foeti 56 days | Liveborn 21–28 days | Liveborn 56 days | Stillborn 21–28 days | Stillborn 56 days |
|---|---|---|---|---|---|---|---|---|
| None | 19 | 23 | 11.9 | 10.6 | 10.9 | 9.5 | 1.0 | 1.1 |
| 400 mg. DDVP/day/subject | 20 | 21 | 10.7 | 11.0 | 10.1 | 10.8 | 0.6 | 0.2 |
| 800 mg. DDVP/day/subject | 21 | 20 | 10.9 | 10.5 | 10.4 | 10.1 | 0.5 | 0.4 |

TABLE 9

| Treatment | Number sows and gilts | Total foeti | Born alive | Born dead | Percent change |
|---|---|---|---|---|---|
| Trial 1: | | | | | |
| None | 42 | 11.2 | 426 (10.1) | 45 (1.1) | |
| 400 mg. DDVP/day/subject | 41 | 10.8 | 429 (10.4) | 18 (0.4) | 45 |
| 800 mg. DDVP/day/subject | 41 | 10.6 | 419 (10.2) | 18 (0.4) | 45 |
| Trial 2: | | | | | |
| None | 44 | 11.13 | 463 (10.5) | 28 (0.63) | |
| 400 mg. DDVP/day/subject | 48 | 11.23 | 523 (10.8) | 21 (0.43) | 25 |
| 800mg. DDVP/day/subject | 50 | 11.16 | 526 (10.5) | 23 (0.46) | 17 |

Figures in ( )=average number per litter.

TABLE 10

| Treatment | Number sows and gilts | Number pigs | Average weaning weight pounds | Average mortality/ litter |
|---|---|---|---|---|
| Trial 1: | | | | |
| None | 8 | 76 | 29.26 | 1.0 |
| 400 mg. DDVP/day/subject | 8 | 83 | 31.42 | 0.125 |
| 800 mg. DDVP/day/subject | 8 | 84 | 35.18 | 0.0 |
| Trial 2: | | | | |
| None | 6 | 56 | 27.3 | 1.33 |
| 400 mg. DDVP/day/subject | 6 | 61 | 26.8 | 0.166 |
| 800 mg. DDVP/day/subject | 6 | 62 | 30.8 | 0.0 |

TABLE 11

| Treatment | Number litters | Weaning weight pounds | Percent improvement |
|---|---|---|---|
| Control | 8 | 32.58 | |
| 400 mg. DDVP/day/subject | 8 | 36.81 | 14.8 |
| 800 mg. DDVP/day/subject | 8 | 39.28 | 22.6 |

EXAMPLE 6

This same general test procedure was used, except that the feeding of the DDVP was begun 3–4 weeks before the female swine was bred and continued throughout gestation. In addition to the results expected from the tests already described, it was also noted that farrowing time was substantially decreased, in the cases of the animals that had been dosed with the DDVP. This is demonstrated in Table 12.

TABLE 12

| Treatment | Number gilts | Number pigs born alive | Average Number live pigs/litter | Number pigs born dead | Average Average foeti/litter | Average farrowing time, minutes |
|---|---|---|---|---|---|---|
| None | 13 | 111 | 8.53 | 8 | 9.15 | 150 |
| 400 mg. DDVP/day/subject | 20 | 194 | 9.76 | 11 | 10.25 | 85 |
| 800 mg. DDVP/day/subject | 17 | 161 | 9.47 | 7 | 9.88 | 65 |

TABLE 13

| Treatment | Number sows and gilts | Average foeti/litter | Born alive | Born dead | Percent difference |
|---|---|---|---|---|---|
| None | 25 | 9.32 | 214(8.56) | 19(0.76) | |
| 800 mg. DDVP/day/subject | 23 | 9.9 | 219(9.51) | 9(0.39) | 52 |

Figures in ( ) = average/litter.

TABLE 14

| Treatment | Number sows and gilts | Number pigs | Average weaning weight, pounds | Average weaned/ litter | Average mortality/ litter |
|---|---|---|---|---|---|
| None | 10 | 91 | 19.78 | 9.1 | 1.0 |
| 800 mg. DDVP/day/subject | 10 | 102 | 26.38 | 10.2 | 0.0 |

EXAMPLE 7

Again, the same general test procedure was used, employing a dosage of 800 milligrams of DDVP per pig per day, for about 3 weeks, during the last trimester of pregnancy, except that the piglets were separated from the mother at the time of birth and never were allowed to suckle, in comparison to the controls. The piglet mortality was markedly reduced, compared to the controls, as is demonstrated in Table 15.

TABLE 15

| Treatment | Number sows | Total foeti | 66-hour Mortality | Percent mortality |
|---|---|---|---|---|
| None | 2 | 24 | 14 | 60.9 |
| 800 mg. DDVP/day/subject | 6 | 46 | 13 | 28.6 |

EXAMPLE 8

The tests described in Example 6 were repeated. In addition to the results noted in Example 6, it was found that there was a greater uniformity in body weight within the litters from the mothers which had been treated with DDVP than within litters from mothers who had not been treated with DDVP. Table 16 reports the results of the tests.

TABLE 16.—WEANING WEIGHTS

| Treatment | Number gilts | Average pigs weaned/litter | Average weaning weight/litter, pounds | Percent pigs in each weight (pound) category | | | | | | | | | |
|---|---|---|---|---|---|---|---|---|---|---|---|---|---|
| | | | | 6-10 | 11-15 | 16-20 | 21-25 | 26-30 | 31-35 | 36-40 | 41-45 | 46-50 | 51-55 |
| None | 10 | 9.1 | 19.86 | 12.08 | 17.58 | 27.47 | 19.78 | 14.28 | 5.48 | 3.29 | 0.0 | 0.0 | 0.0 |
| 800 mg. DDVP/gilt/day[1] | 10 | 10.2 | 26.37 | 1.96 | 3.92 | 11.76 | 29.41 | 34.31 | 7.84 | 3.92 | 2.94 | 2.94 | 0.98 |

[1] From 3 weeks before breeding through gestation.

EXAMPLE 9

Comparative tests also were conducted with respect to bitches, a particulate formulation of DDVP in polyvinyl chloride resin being administered to the animals daily—in gelatin capsules or in their feed—from the day they were bred to the day of parturition. The dosage was 4–6 milligrams of DDVP per kilogram of dog body weight per day, of which about 40% was absorbed by the animal. The results, summarized in Table 17, are essentially those attained with the pigs: there were fewer stillbirths from the treated mothers and more of the young survived birth and the first 48 hours thereafter.

TABLE 17

| Treatment | Number bitches | Average bitch weight pounds | Total puppies born | Stillbirths and first 48-hour post-parturient mortality | Percent mortality |
|---|---|---|---|---|---|
| None | 7 | 22.1 | 30 | 6 | 20 |
| 6 mg. DDVP a.i./kg | 7 | 30.4 | 46 | 3 | 6.5 |
| 4 mg. DDVP a.i./kg | 7 | 23.7 | 42 | 1 | 2.4 |

EXAMPLE 10

The increase in blood glucose value of the blood of foeti and new-born young was demonstrated by determination of blood glucose values of the young of certain of the mothers treated as described in Example 5, immediately after birth, and 24 hours after birth. The results are summarized in Table 18.

Furthermore, as is shown in Table 19, this result was confirmed in further tests, which also established that under 24-hour starvation conditions, the young of the treated sows encountered a smaller decline in blood glucose values than the young of untreated ones.

TABLE 18

| Treatment | Number Sow | Number pigs born live | Average blood glucose values, mg. percent | | | |
|---|---|---|---|---|---|---|
| | | | Number samples | 0 hours | Number samples | 24 hours |
| None | 81 | 10 | 10 | 45.7 | 4 | 41.6 |
| | 85 | 10 | 10 | 51.6 | 5 | 25.2 |
| Average | | | | 48.6 | | 33.4 |
| 400 mg. DDVP/day/subject | 67 | 10 | 10 | 78.1 | 3 | 32.4 |
| | 84 | 7 | 7 | 50.9 | 4 | 40.3 |
| Average | | | | 50.9 | 4 | 40.3 |
| 800 mg. DDVP/day/subject | 63 | 10 | 10 | 69.8 | 5 | 54.2 |
| | 72 | 12 | 12 | 75.7 | 6 | 50.0 |
| Average | | | | 72.7 | | 52.1 |

TABLE 19

| Treatment | No. sows | Average blood glucose values, mg. percent | | Percent decline |
|---|---|---|---|---|
| | | 0 hours | 24 hours (starvation conditions) | |
| None | 79 | 50.3 | 31.4 | 37.7 |
| 400 mg. DDVP/day/subject | 67 | 62.5 | 42.1 | 32.7 |
| 800 mg. DDVP/day/subject | 68 | 64.8 | 43.8 | 32.4 |

We claim as our invention:

1. A method for increasing the vitality of a fetus of a mammal and the new-born animal, which comprises administering to the pregnant female mammal prior to about 1 week before parturition an effective amount of a compound of the formula

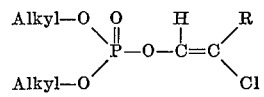

in which alkyl and alkyl' may be the same or different alkyl groups containing from 1 to 4 carbon atoms each, with the proviso that when alkyl is methyl, alkyl' can contain up to 20 carbon atoms, and R represents hydrogen or chlorine, said amount of the compound being received by the pregnant female mammal in a series of dosages.

2. A method according to claim 1 wherein the phosphate is orally administered in the form of an intimate admixture with a polyvinyl chloride resin.

3. A method according to claim 2 wherein R is chlorine.

4. A method according to claim 3 wherein alkyl and alkyl' each is methyl.

References Cited

UNITED STATES PATENTS

| | | | |
|---|---|---|---|
| 3,166,472 | 1/1965 | Menn et al. | 167—53 |
| 3,318,769 | 5/1967 | Folckemer et al. | 167—42 |
| 3,398,225 | 8/1968 | Bellin | 424—34 |

ALBERT T. MEYERS, Primary Examiner

A. J. ROBINSON, Assistant Examiner

U.S. Cl. X.R.

424—219